United States Patent
Li et al.

(10) Patent No.: US 9,858,648 B2
(45) Date of Patent: Jan. 2, 2018

(54) METHOD AND DEVICE FOR CONTROLLING SCREEN ROTATION

(71) Applicant: Xiaomi Inc., Beijing (CN)

(72) Inventors: Shen Li, Beijing (CN); Fan Jin, Beijing (CN); Yuwen Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/932,696

(22) Filed: Nov. 4, 2015

(65) Prior Publication Data

US 2016/0055623 A1    Feb. 25, 2016

Related U.S. Application Data

(63) Continuation of application No. PCT/CN2014/076197, filed on Apr. 25, 2014.

(30) Foreign Application Priority Data

May 17, 2013    (CN) .......................... 2013 1 0184731

(51) Int. Cl.
*G06T 3/60* (2006.01)
*G06F 3/01* (2006.01)
(Continued)

(52) U.S. Cl.
CPC .............. *G06T 3/60* (2013.01); *G06F 1/1626* (2013.01); *G06F 1/1694* (2013.01); *G06F 3/017* (2013.01); *G06F 3/0487* (2013.01); *H04M 1/72569* (2013.01); *G06F 2200/1614* (2013.01); *G06F 2200/1637* (2013.01)

(58) Field of Classification Search
None
See application file for complete search history.

(56) References Cited

U.S. PATENT DOCUMENTS 8,217,964 B2    7/2012 Laine et al.
8,973,086 B2    3/2015 Tamura
(Continued)

FOREIGN PATENT DOCUMENTS

CN      102118488 A    7/2011
CN      102662596 A    9/2012
(Continued)

OTHER PUBLICATIONS

StackOverflow, Making an Android App Run Full Screen and Landscape, Jan. 2013, retrieved from <<http://stackoverflow.com/questions/14182366/making-an-android-app-run-full-screen-and-landscape>>, accessed Sep. 14, 2016.*

(Continued)

*Primary Examiner* — Michael J Cobb
(74) *Attorney, Agent, or Firm* — Finnegan, Henderson, Farabow, Garrett & Dunner LLP

(57) ABSTRACT

A method for controlling screen rotation for use in a mobile terminal is provided. The method includes: when the mobile terminal enters a full-screen mode, locking a screen orientation of the mobile terminal, and acquiring an initial posture of the mobile terminal; monitoring a real-time posture of the mobile terminal in real time; and determining a screen rotation direction by comparing the real-time posture with the initial posture.

6 Claims, 15 Drawing Sheets

(51) Int. Cl.
*G06F 3/0487* (2013.01)
*G06F 1/16* (2006.01)
*H04M 1/725* (2006.01)

(56) References Cited

U.S. PATENT DOCUMENTS

| | | | |
|---|---|---|---|
| 9,141,133 | B2 | 9/2015 | Murayama |
| 9,213,419 | B1* | 12/2015 | Cassidy ............... G06F 3/03 |
| 9,390,474 | B2 | 7/2016 | Laine et al. |
| 2005/0143124 | A1* | 6/2005 | Kennedy ............ G06F 1/1626 455/556.1 |
| 2008/0062134 | A1* | 3/2008 | Duarte ................ G06F 1/1624 345/169 |
| 2009/0207184 | A1 | 8/2009 | Laine et al. |
| 2009/0237420 | A1 | 9/2009 | Lawrenz |
| 2011/0267753 | A1 | 11/2011 | Murayama |
| 2012/0001943 | A1* | 1/2012 | Ishidera ............. G06F 3/0346 345/659 |
| 2012/0299964 | A1* | 11/2012 | Homma .............. G06F 1/1694 345/649 |
| 2013/0038634 | A1* | 2/2013 | Yamada .................. G09G 5/00 345/649 |
| 2013/0113836 | A1 | 5/2013 | Shin et al. |
| 2013/0244725 | A1 | 9/2013 | Tamura |
| 2014/0085341 | A1* | 3/2014 | Shin ........................ G09G 5/38 345/659 |
| 2014/0300640 | A1* | 10/2014 | Kazanjian ............ G06F 1/1684 345/659 |
| 2014/0300642 | A1 | 10/2014 | Laine et al. |
| 2015/0363967 | A1* | 12/2015 | Wells .................. G06T 15/20 345/419 |

FOREIGN PATENT DOCUMENTS

| | | |
|---|---|---|
| CN | 102929406 A | 2/2013 |
| CN | 103294358 A | 9/2013 |
| EP | 2383627 A1 | 11/2011 |
| JP | 2005-018217 A | 1/2005 |
| JP | 2006-135794 A | 5/2006 |
| JP | 2007-158819 A | 6/2007 |
| JP | 2010-086192 A | 4/2010 |
| JP | 2010-245833 A | 10/2010 |
| JP | 2011-135605 A | 7/2011 |
| JP | 2011-233064 A | 11/2011 |
| JP | 2012-194811 A | 10/2012 |
| JP | 2012-208498 A | 10/2012 |
| JP | 2012-256290 A | 12/2012 |
| KR | 10-2011-0130190 A | 12/2011 |
| RU | 2480938 C2 | 4/2013 |

OTHER PUBLICATIONS

Daniel Dura, Using Screen Orientation APIs for Smartphone Application Development, 2010, retrieved from <<http://www.adobe.com/devnet/flash/articles/screen_orientation_apis.html>>, accessed Sep. 11, 2016.*

AndroidDevelopers, WindowManager.LayoutParams, 2010, retrieved from <<https://developer.android.com/reference/android/view/WindowManager.LayoutParams.html>>, accessed Sep. 14, 2016.*

AndroidDevelopers, ActivityInfo, 2010, retrieved from <<https://developer.android.com/reference/android/content/pm/ActivityInfo.html>>, accessed Sep. 14, 2016.*

David Mizell, Using Gravity to Estimate Accelerometer Orientation, 2003, Proceedings of the Seventh IEEE International Symposium on Wearable Computers ISWC'03, pp. 1-2.*

Tizen, Sensors, 2016, retrieved from <<https://developer.tizen.org/dev-guide/native/2.3.0//org.tizen.mobile.native.appprogramming/html/guide/system/sensor.htm>>, accessed Sep. 14, 2016.*

StackOverflow, I Want My Android Application to be Only Run in Portrait Mode?, 2011, retrieved from <<https://developer.tizen.org/dev-guide/native/2.3.0//org.tizen.mobile.native.appprogramming/html/guide/system/sensor.htm>>, accessed Sep. 14, 2016.*

International Search Report of PCT/CN2014/076197, mailed from the State Intellectual Property Office of China dated Aug. 13, 2014.

Extended European Search Report of European Patent Application No. 14797656.7, from the European Patent Office, dated May 12, 2016.

* cited by examiner

METHOD AND DEVICE FOR CONTROLLING SCREEN ROTATION

CROSS-REFERENCE TO RELATED APPLICATIONS

The present application, is a continuation of International Application No. PCT/CN2014/076197, filed Apr. 25, 2014, which is based upon and claims priority to Chinese Patent Application. No. 201310184731.1, filed May 17, 2013, the entire contents of all of which are incorporated herein by reference.

TECHNICAL FIELD

The present disclosure generally relates to the field of mobile terminals and, more particularly, to a method and a device for controlling rotation of a screen.

BACKGROUND

Mobile terminals, such as mobile phones and tablet computers, often allow screen rotation for rotating an image displayed on a screen. For example, a user may change a screen, orientation, of a mobile terminal by rotating the mobile terminal. Conventionally, a mobile terminal has a built-in gravity sensor to determine a current posture of the mobile terminal. When the mobile terminal is positioned in or close to a standard posture, i.e., an upright posture, the screen has an upright portrait orientation. When the mobile terminal rotates, the screen rotates accordingly to a left landscape orientation, a reverse portrait orientation, or a right landscape orientation.

However, such method of controlling screen orientation presumes that the user always stands or sits upright while using the mobile terminal, and therefore may cause undesirable screen rotations when the user is in other postures. For example, when the user browses pictures on the mobile terminal while lying on a bed, the mobile terminal is positioned horizontally and the screen may often rotate undesirably.

SUMMARY

According to a first aspect of the present disclosure, there is provided a method for controlling screen rotation for use in a mobile terminal, comprising: when the mobile terminal enters a full-screen mode, locking a screen orientation, of the mobile terminal, and acquiring an initial posture of the mobile terminal; monitoring a real-time posture of the mobile terminal in real time; and determining a screen rotation direction by comparing the real-time posture with the initial posture.

According to a second aspect of the present disclosure, there is provided a device for controlling screen rotation, comprising: a processor; and a memory for storing instructions executable by the processor; wherein the processor is configured to: when the device enters a full-screen mode, lock a screen orientation of the device, and acquire an initial posture of the device; monitor a real-time posture of the device in real time; and determine a screen rotation direction by comparing the real-time posture with the initial posture.

According to a third aspect of the present disclosure, there is provided a non-transitory computer-readable storage medium storing instructions that, when executed by one or more processors of a mobile terminal, cause the mobile terminal to perform a method for controlling screen rotation, the method comprising: when the mobile terminal enters a full-screen mode, locking a screen orientation of the mobile terminal, and acquiring an initial posture of the mobile terminal; monitoring a real-time posture of the mobile terminal in real time; and determining a screen rotation direction by comparing the real-time posture with the initial posture.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
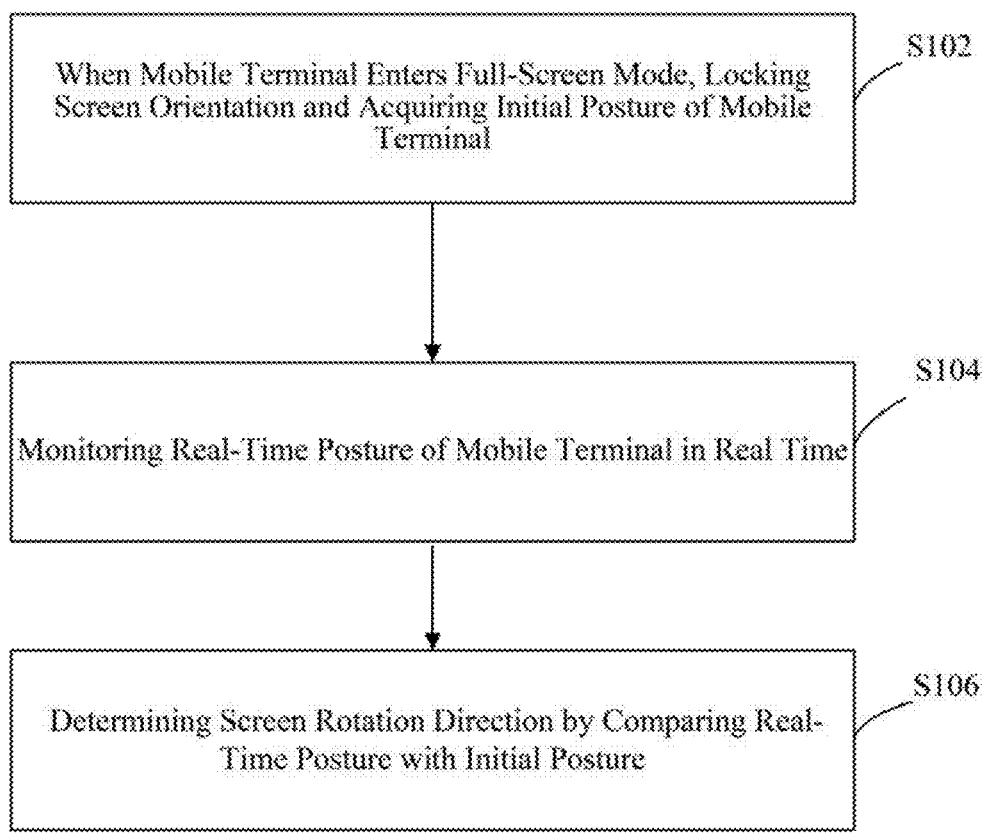
FIG. 1 is a flowchart of a method for controlling screen rotation, according to an exemplary embodiment.

FIG. 1 is a flowchart of a method 100 for controlling screen rotation, according to an exemplary embodiment. For example, the method 100 may be used in a mobile terminal, such as a mobile phone or a tablet computer. The method 100 may be implemented by an operating system or an application installed in the mobile terminal. Referring to FIG. 1, the method 100 may include the following steps.

In step S102, when the mobile terminal enters a full-screen mode, the mobile terminal locks a screen orientation, and acquires an initial posture of the mobile terminal.

In exemplary embodiments, postures of the mobile terminal may be acquired based on a gravitational acceleration of the mobile terminal. The gravitational acceleration may include components in an X-direction and a Y-direction. For example, the X-direction is a horizontal rightward direction along the mobile terminal, and the Y-direction is an upright direction along the mobile terminal. Accordingly, to perform step S102, the mobile terminal may acquire and record the X- and Y-components of the initial gravitational acceleration, denoted as $X_0$ and $Y_0$, respectively, and determine the initial posture according to $X_0$ and $Y_0$.

In exemplary embodiments, the method 100 may further include determining a correction value for a screen-orientation identifier of the mobile terminal according to the initial posture. The screen-orientation identifier is configured to identify a screen orientation of the mobile terminal. The screen orientation may be one of an upright portrait orientation, a left landscape orientation, a reverse portrait orientation, and a right landscape orientation.

In step S104, the mobile terminal monitors a real-time posture of the mobile terminal in real time.

In exemplary embodiments, the mobile terminal may monitor the X- and Y-components of the gravitational acceleration in real time, denoted as $X_1$ and $Y_1$, respectively, and determine the real-time posture according to $X_1$ and $Y_1$.

In step S106, the mobile terminal compares the real-time posture with the initial posture to determine a screen rotation direction.

In exemplary embodiments, the mobile terminal may determine a screen-orientation identifier according to the real-time posture of the mobile terminal. The mobile terminal may further correct the screen-orientation identifier according to the correction value to obtain a corrected screen-orientation identifier. When the corrected screen-orientation identifier differs from the screen-orientation identifier corresponding to the initial posture, the mobile terminal rotates the screen to an orientation identified by the corrected screen-orientation identifier.

Figure 2:
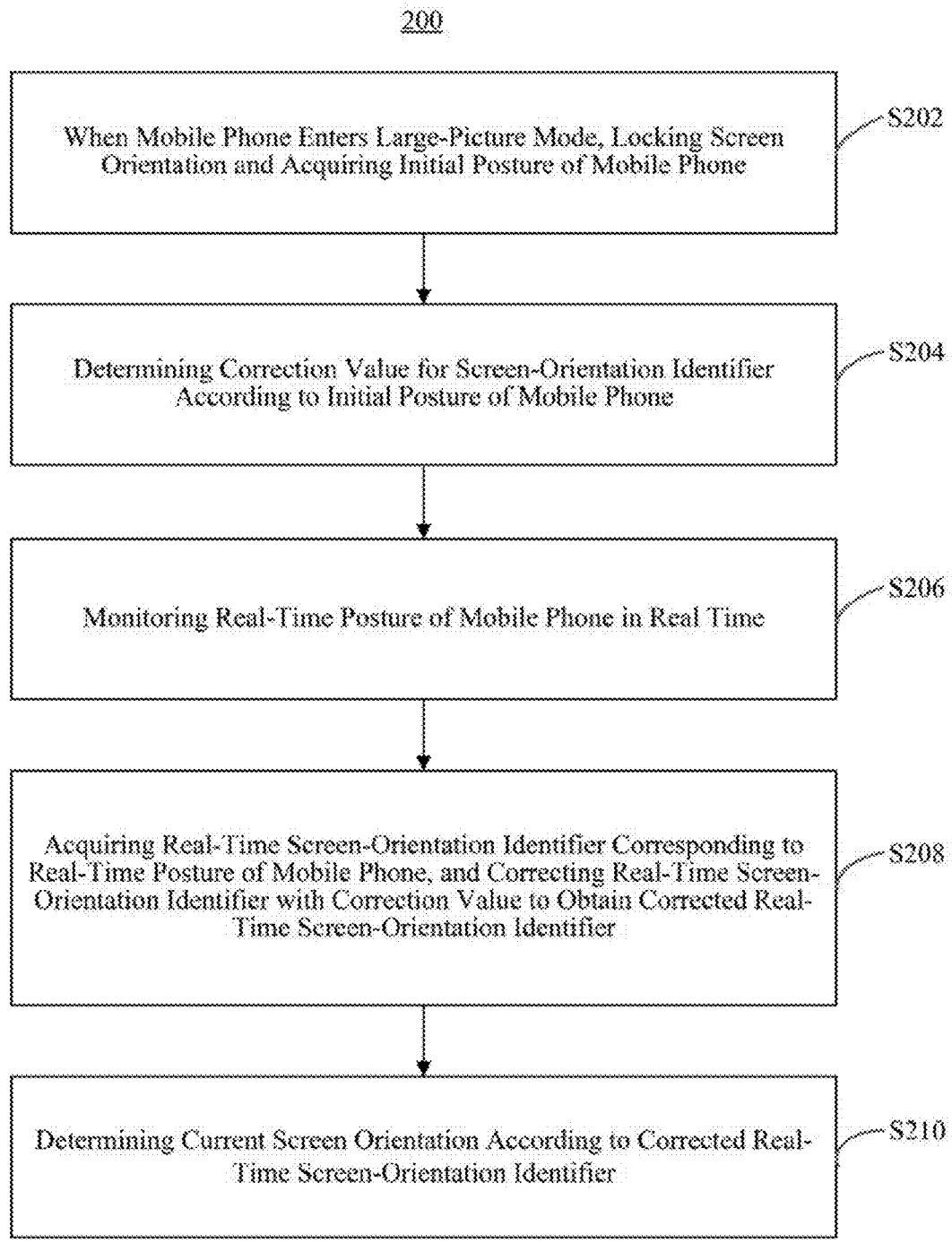
FIG. 2 is a flowchart of a method for controlling screen rotation, according to an exemplary embodiment.
Figure 3:
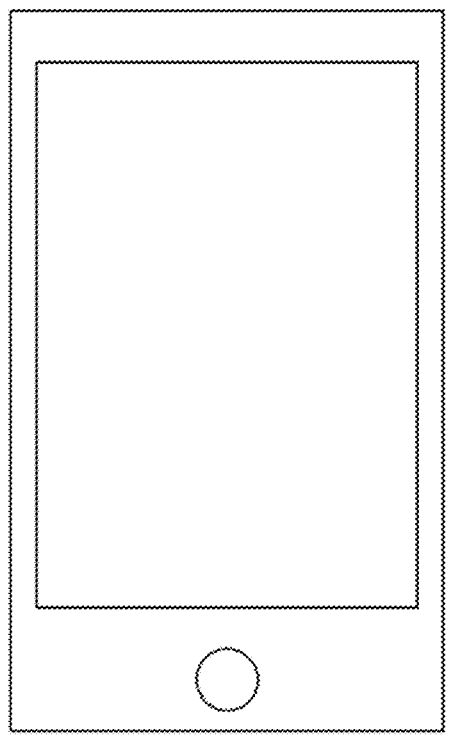
FIG. 3 is a schematic diagram illustrating an upright portrait posture of a mobile phone, according to an exemplary embodiment.
Figure 4:
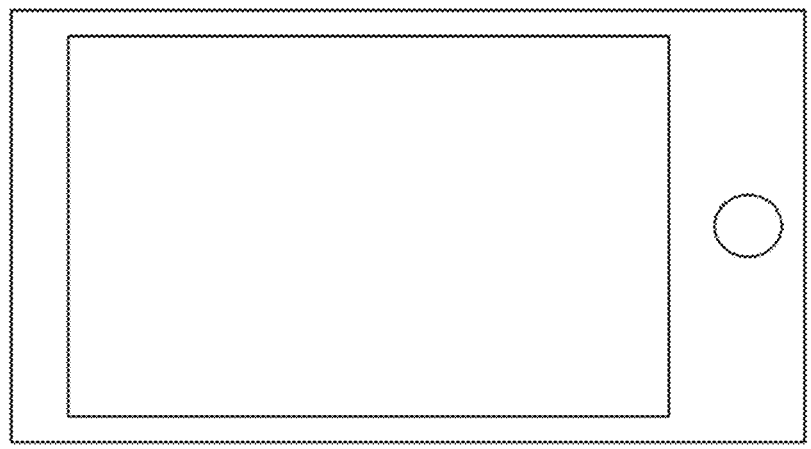
FIG. 4 is a schematic diagram illustrating a left landscape posture of a mobile phone, according to an exemplary embodiment.
Figure 5:
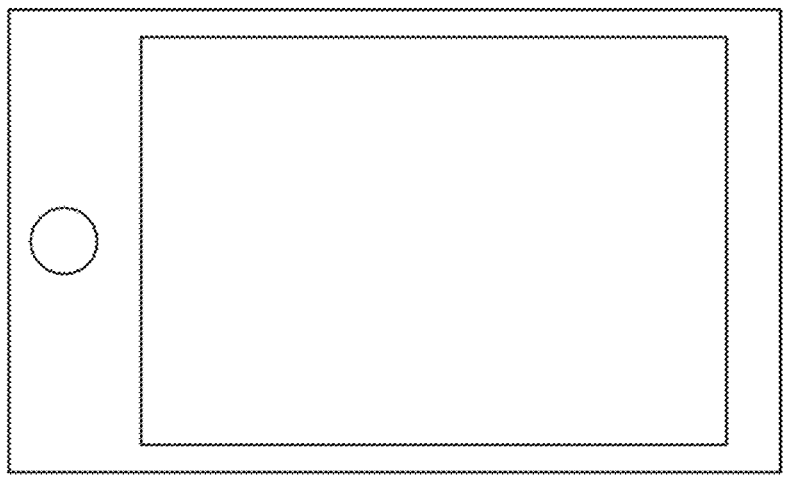
FIG. 5 is a schematic diagram illustrating a right landscape posture of a mobile phone, according to an exemplary embodiment.
Figure 6:
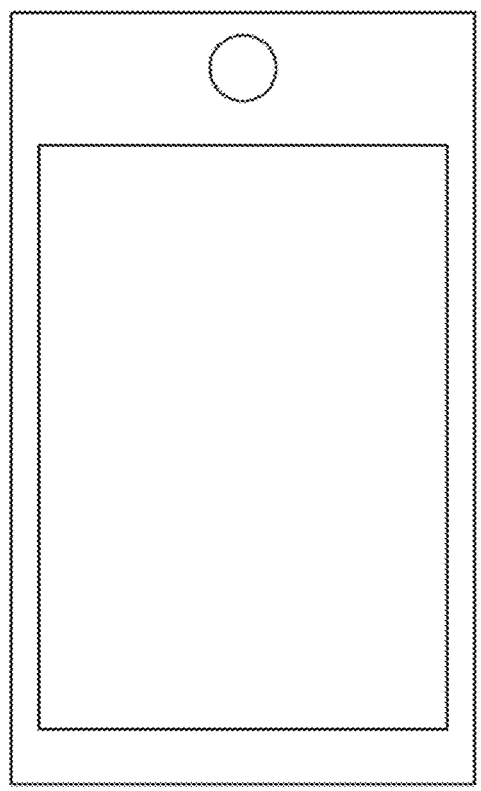
FIG. 6 is a schematic diagram illustrating a reverse portrait posture of a mobile phone, according to an exemplary embodiment.

FIG. 2 is a flowchart of a method 200 for controlling screen rotation, according to an exemplary embodiment. For example, the method 200 may be performed when a user is browsing pictures in an album on a mobile phone. Referring to FIG. 2, the method 200 may include the following steps.

In step S202, when entering a large-picture mode for displaying pictures, the mobile phone locks a screen orientation and acquires a posture of the mobile phone as an initial posture.

In exemplary embodiments, the posture of the mobile phone may be acquired based on a gravitational acceleration recorded by a gravity sensor in the mobile phone. The gravitational acceleration may include components in both an X-direction and a Y-direction. For example, the X-direction is a horizontal rightward direction along the mobile phone, and the Y-direction is an upright direction along the mobile phone. The X-direction is perpendicular to the Y-direction.

Using the upright orientation of the mobile terminal as a reference, the mobile phone may have four postures; upright portrait, left landscape, right landscape, and reverse portrait. FIGS. 3-6 schematically illustrate the four postures, respectively.

If the components of the gravitational acceleration in the X- and Y-directions are denoted as $X_0$ and $Y_0$, respectively, then:

when $X_0 > P$, the posture may be determined to be left landscape;

when $X_0 < -P$, the posture may be determined to be right landscape;

when $Y_0 > P$, the posture may be determined to be upright portrait; and when $Y_0 < -P$, the posture may be determined to be reverse portrait;

where P is a value chosen based on empirical data or a required judgment accuracy. For example, P may be set to 5 m/s$^2$.

In exemplary embodiments, the postures of the mobile phone may be recorded by a gravity sensor or other sensors, such as an acceleration sensor, a direction sensor, etc. For example, the direction sensor may be used to detect a rotation angle of the mobile phone. If the rotation angle is denoted as rotation, then:

when $0 \leq rotation \leq 45°$ or $315° \leq rotation \leq 360°$, the posture may be determined to be upright portrait;

when $45° \leq rotation \leq 135°$, the posture may be determined to be right landscape;

when $135° \leq rotation \leq 225°$, the posture may be determined to be reverse portrait; and when $225° \leq rotation \leq 315°$, the posture may be determined to be left landscape.

Figure 7:
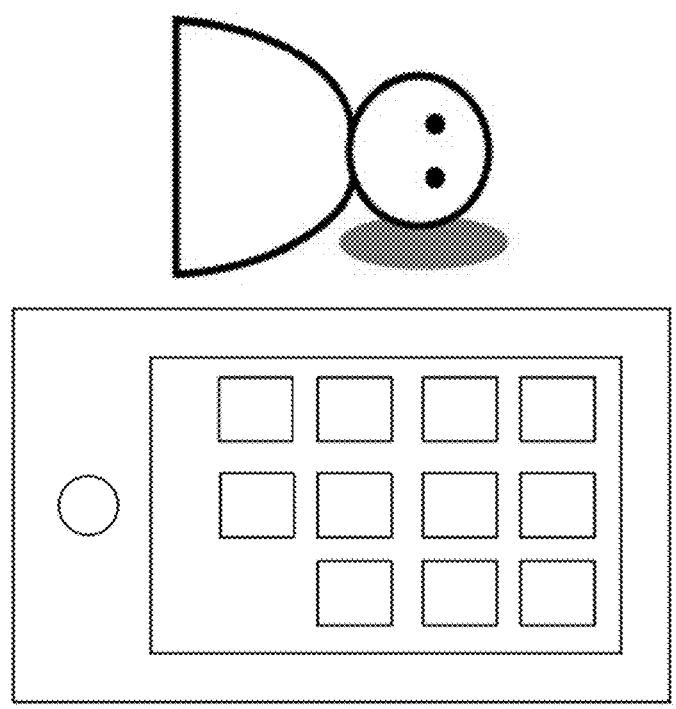
FIG. 7 is a schematic diagram illustrating an example of acquiring an initial posture of a mobile phone, according to an exemplary embodiment.

FIG. 7 is a schematic diagram illustrating an example of acquiring an initial posture of the mobile phone, according to an exemplary embodiment. Referring to the example in FIG. 7, when a user lies down on the right side and hits a picture on the mobile phone, the mobile phone enters a large-picture mode and acquires a right landscape posture as the initial posture.

Figure 8:
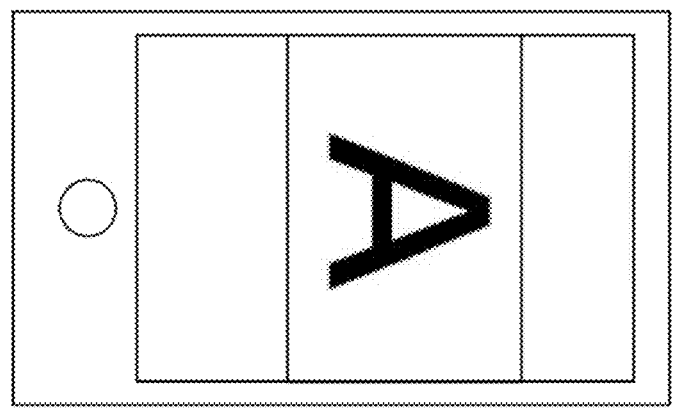
FIG. 8 is a schematic diagram illustrating an example of locking a screen orientation when a mobile phone enters a full-screen mode, according to an exemplary embodiment.

FIG. 8 is a schematic diagram illustrating an example of locking a screen orientation, according to an exemplary embodiment. Referring to the example in FIG. 8, after entering a full-screen mode and acquiring a right landscape posture, the mobile phone locks the initial screen orientation to prevent any screen rotation.

In the above description, the method 200 is illustrated by viewing a picture on the mobile terminal. One of ordinary skill in the art will understand that the method 200 may be applied to other applications which require full-screen display, such as playing a full-screen game, browsing a webpage in full screen, etc. Accordingly, for example, step S202 may include, when entering a game mode or a webpage-browsing mode, the mobile phone locks the screen orientation and acquires the posture of the mobile phone as an initial posture.

Referring back to FIG. 2, in step S204, the mobile phone determines a correction value for a screen-orientation identifier of the screen according to the acquired initial posture.

In exemplary embodiments, the screen-orientation identifier, denoted as mCurrentOrientation, is configured to represent a screen orientation. The screen orientation may be defined using the upright orientation of the mobile phone as a reference. Namely, the screen orientation may be one of an upright portrait orientation, a left landscape orientation, a reverse portrait orientation, and a right landscape orientation. An operating system or an application of the mobile phone may read the screen-orientation identifier to determine the screen orientation.

The correction value of the screen-orientation identifier, denoted as mFixOrientation, may be used to correct the screen-orientation identifier so as to avoid an undesirable rotation of the screen. For example, the correction value may be set as the following:

when the initial posture is upright portrait, mCurrentOrientation=0, and mFixOrientation=0;
when the initial posture is right landscape, mCurrentOrientation=1, and mFixOrientation=3;
when the initial posture is reverse portrait, mCurrentOrientation=2, and mFixOrientation=2; and
when the initial posture is left landscape, mCurrentOrientation=3, and mFixOrientation=1.

In step S206, the mobile phone monitors a real-time posture of the mobile phone in real time.

In exemplary embodiments, the mobile phone may acquire the X- and Y-components of the real-time gravitational acceleration, denoted as $X_1$ and $Y_1$, respectively, at regular intervals, e.g., every 1 ms. Similar to determining the initial posture in step S202 based on $X_0$ and $Y_0$, the mobile phone may determine the real-time posture based on $X_1$ and $Y_1$.

In step S208, the mobile phone acquires a real-time screen-orientation identifier corresponding to the real-time posture of the mobile phone. The mobile phone further uses the correction value to correct the real-time screen-orientation identifier to obtain a corrected real-time screen-orientation identifier.

Because the user does not always stand or sit upright while using the mobile phone, the correction of the real-time screen-orientation identifier aims to avoid an undesirable screen rotation. In exemplary embodiments, the real-time screen-orientation identifier is corrected through the following equation:

$$mCurrentOrientation=(mCurrentOrientation+mFixOrientation)\%4,$$

where "%" represents a modulo operation, "mCurrentOrientation" on the left side of the equation denotes the corrected real-time screen-orientation identifier, "mCurrentOrientation" on the right side of the equation denotes the acquired real-time screen-orientation identifier, and "mFixOrientation" denotes the correction value obtained according to the initial posture of the mobile phone.

In step S210, the mobile phone determines the current screen orientation according to the corrected real-time screen-orientation identifier.

In exemplary embodiments, when the corrected real-time screen-orientation identifier is different from the screen-orientation identifier corresponding to the initial posture, the mobile phone rotates the screen to an orientation corresponding to the corrected real-time screen-orientation identifier. When the corrected real-time screen-orientation identifier is the same as the screen-orientation identifier corresponding to the initial posture, the mobile phone does not change the screen orientation.

Figure 9:
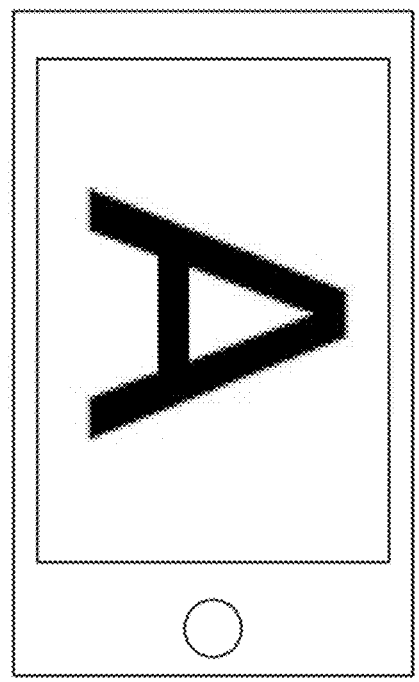
FIG. 9 is a schematic diagram illustrating an example of adjusting a screen orientation of a mobile phone, according to an exemplary embodiment.
Figure 10:
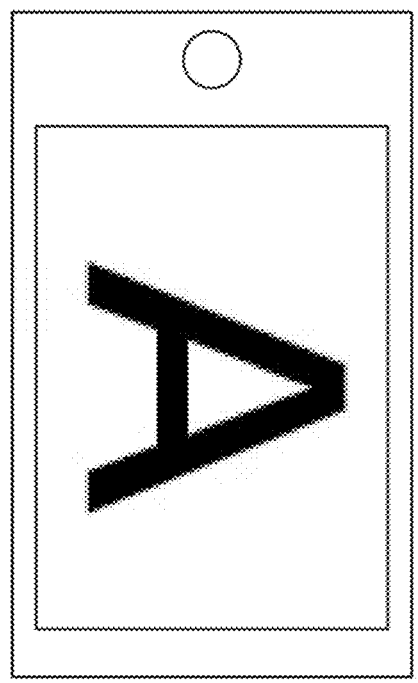
FIG. 10 is a schematic diagram illustrating an example of adjusting a screen orientation of a mobile phone, according to an exemplary embodiment.

FIG. 9 is a schematic diagram illustrating an example of adjusting the screen orientation of the mobile phone, according to an exemplary embodiment. Referring to the example in FIG. 9, when the real-time posture of the mobile phone is upright portrait, the mobile phone adjusts the screen to the left landscape orientation. FIG. 10 is a schematic diagram illustrating an example of adjusting the screen orientation of the mobile phone, according to an exemplary embodiment. Referring to the example in FIG. 10, when the real-time posture of the mobile phone is reverse portrait, the mobile phone adjusts the screen to the left landscape orientation. The screen orientations in the examples illustrated by FIGS. 9 and 10 are both desirable orientations when the user is lying on the right side.

In exemplary embodiments, the mobile phone may terminate the method 200 when exiting the large-picture mode, and may acquire a new initial posture when reentering the large-picture mode. However, to maintain smooth user experience, when the large-picture mode is only temporarily interrupted, e.g., by the user pushing the "Home" button, the mobile phone may continue to use the previously acquired initial posture and corrected screen-orientation identifier when the large-picture mode resumes.

Figure 11:
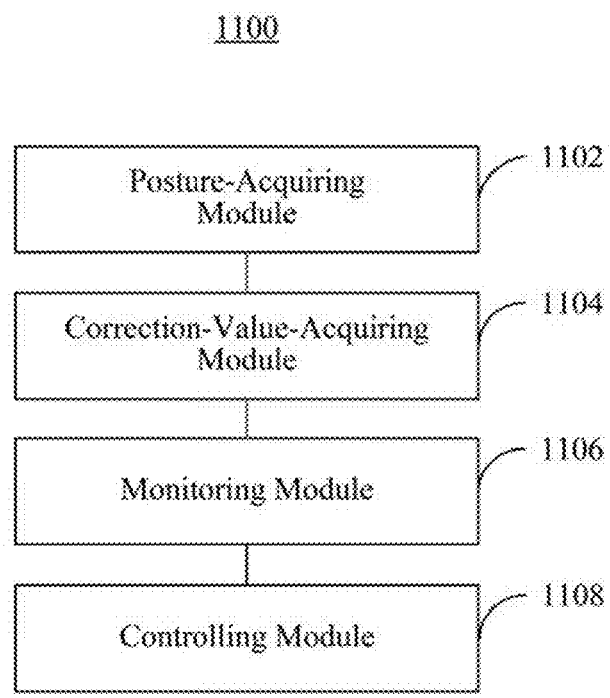
FIG. 11 is a block diagram of a device for controlling screen rotation, according to an exemplary embodiment.

FIG. 11 is a block diagram of a device 1100 for controlling screen rotation, according to an exemplary embodiment. For example, the device 1100 may be a mobile terminal, such as a mobile phone or a tablet computer. The device 1100 may be used for performing the method 100 (FIG. 1) and method 200 (FIG. 2). Referring to FIG. 11, the device 1100 may include a posture-acquiring module 1102, a correction-value-acquiring module 1104, a monitoring module 1106, and a controlling module 1108.

The posture-acquiring module 1102 is configured to acquire an initial posture and lock a screen orientation of the device 1100, when the device 1100 enters a full-screen mode. The correction-value-acquiring module 1104 is configured to determine a correction value for a screen-orientation identifier of the device 1100 according to the initial posture of the mobile terminal. The screen-orientation identifier is configured to identify a screen orientation of the device 1100. The screen orientation may be one of an upright portrait orientation, a left landscape orientation, a reverse portrait orientation, and a right landscape orientation. The monitoring module 1106 is configured to monitor a real-time posture of the device 1100 in real time. The controlling module 1108 is configured to compare the initial posture with the real-time posture to determine a rotation direction of the device 1100. The initial posture and the real-time posture may be expressed by a gravitational acceleration of the device 1100. The gravitational acceleration may include a component in an X-direction and a component in a Y-direction. For example, the X-direction is a horizontal rightward direction along the device 1100, and the Y-direction is an upright direction along the device 1100.

Figure 12:
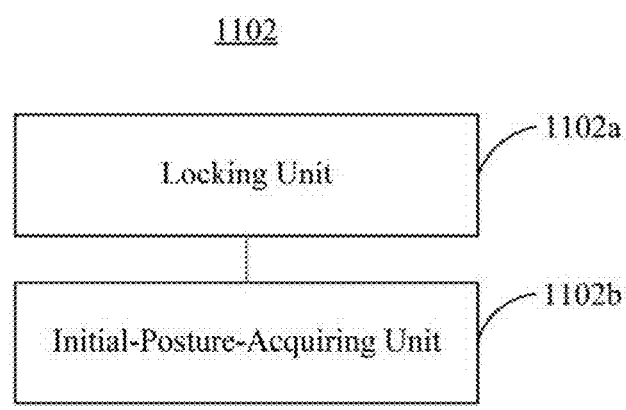
FIG. 12 is a block diagram of a posture-acquiring module used in a device for controlling screen rotation, according to an exemplary embodiment.

FIG. 12 is a block diagram of the posture-acquiring module 1102 used in the device 1100 (FIG. 11), according to an exemplary embodiment. Referring to FIG. 12, the posture-acquiring module 1102 may include a locking unit 1102a and an initial-posture-acquiring unit 1102b.

The locking unit 1102a is configured to lock the screen orientation when the device 1100 enters the full-screen mode. The initial-posture-acquiring unit 1102b is configured to acquire and record the X- and Y-components of the initial gravitational acceleration of the device 1100, i.e., $X_0$ and $Y_0$, and determine the initial posture of the device 1100 according to $X_0$ and $Y_0$.

Figure 13:
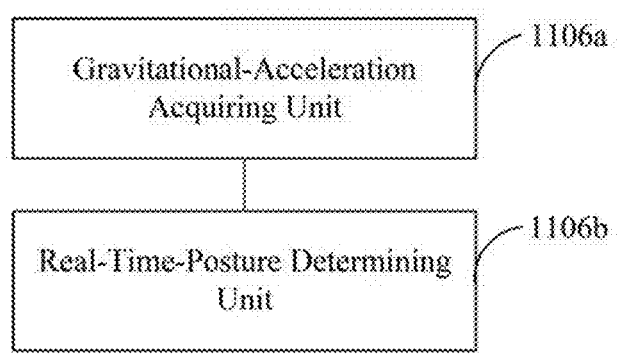
FIG. 13 is a block diagram of a monitoring module used in a device for controlling screen rotation, according to an exemplary embodiment.

FIG. 13 is a block diagram of the monitoring module 1106 used in the device 1100 (FIG. 11), according to an exemplary embodiment. Referring to FIG. 13, the monitoring module 1106 may include a gravitational-acceleration acquiring unit 1106a and a real-time-posture determining unit 1106b.

The gravitational-acceleration, acquiring unit 1106a is configured to monitor the X- and Y-components of the real-time gravitational acceleration in real time, i.e., $X_1$ and $Y_1$. The real-time-posture determining unit 1106*b* is configured to determine the real-time posture of the device 1100 according to $X_1$ and $Y_1$.

Figure 14:
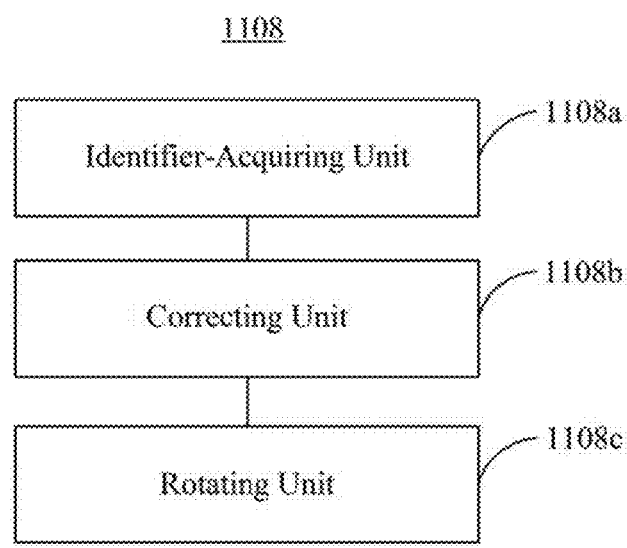
FIG. 14 is a block diagram of a controlling module used in a device for controlling screen rotation, according to an exemplary embodiment.

FIG. 14 is a block diagram of the controlling module 1108 used in the device 1100 (FIG. 11), according to an exemplary embodiment. Referring to FIG. 14, the controlling module 1108 may include an identifier-acquiring unit 1108*a*, a correcting unit 1108*b*, and a rotating unit 1108*c*.

The identifier-acquiring unit 1108*a* is configured to determine the real-time screen-orientation identifier of the device 1100 according to the real-time posture. The correcting unit 1108*b* is configured to correct the real-time screen-orientation identifier according to the correction value. The rotating unit 1108*c* is configured to rotate the screen to the orientation identified by the corrected real-time screen-orientation identifier, when the corrected screen-orientation identifier is different from the screen-orientation identifier corresponding to the initial posture of the device 1100.

Figure 15:
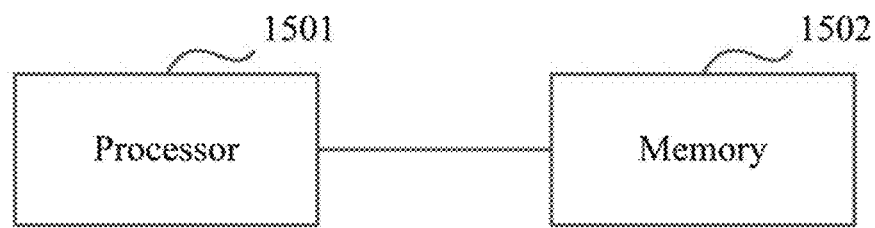
FIG. 15 is a block diagram of a device for controlling screen rotation, according to an exemplary embodiment.

FIG. 15 is a block diagram of a device 1500 for controlling screen rotation, according to an exemplary embodiment. For example, the device 1500 may be a mobile terminal. Referring to FIG. 15, the device 1500 includes a processor 1501 configured to execute instructions to perform the above described methods, and memory resources represented by a memory 1502, for storing the instructions and otherwise facilitating operation of the processor 1501.

In exemplary embodiments, there is also provided a non-transitory computer readable storage medium including instructions, such as included in the memory 1502, executable by the processor 1501 in the device 1500, for performing the above-described methods. For example, the non-transitory computer-readable storage medium may be a ROM, a random access memory (RAM), a CD-ROM, a magnetic tape, a floppy disc, an optical data storage device, and the like.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for controlling screen rotation for use in a mobile terminal, comprising:
when the mobile terminal enters a full-screen mode, locking a screen orientation of the mobile terminal, and acquiring a posture of the mobile terminal at the time of entering the full-screen mode as an initial posture for determining the screen rotation in the full-screen mode;
monitoring real-time posture of the mobile terminal in real time;
each time when the real-time posture changes in the full-screen mode, determining a screen rotation direction by comparing the real-time posture with the initial posture acquired when the mobile terminal enters the full-screen mode; and
rotating the screen orientation based on the determined screen rotation direction,
wherein:
the initial posture and the real-time posture of the mobile terminal each correspond to a gravitational acceleration of the mobile terminal, the gravitational acceleration including a component in an X-direction and a component in a Y-direction, the X-direction being a horizontal rightward direction along the mobile terminal and the Y-direction being an upright direction along the mobile terminal;
the acquiring of the posture of the mobile terminal at the time of entering the full-screen mode as an initial posture for determining the screen rotation in the full-screen mode includes:
acquiring and recording the X-direction component and the Y-direction component of a gravitational acceleration of the mobile terminal when the mobile terminal enters the full-screen mode, and
determining the initial posture of the mobile terminal for determining the screen rotation in the full-screen mode according to the X-direction component and the Y-direction component of the gravitational acceleration acquired when the mobile terminal enters the full-screen mode;
the monitoring of the real-time posture of the mobile terminal in real time includes:
monitoring the X-direction component and the Y-direction component of a real-time gravitational acceleration of the mobile terminal in real time; and
determining the real-time posture of the mobile terminal according to the X-direction component and the Y-direction component of the real-time gravitational acceleration; and
the determining of the screen rotation direction by comparing the real-time posture with the initial posture includes:
determining a correction value for a screen-orientation identifier according to the initial posture of the mobile terminal, wherein the screen-orientation identifier is configured to identify a screen orientation of the mobile terminal as one of an upright portrait orientation, a left landscape orientation, a reverse portrait orientation, and a right landscape orientation.

2. The method according to claim 1, wherein the determining of the screen rotation direction by comparing the real-time posture with the initial posture comprises:
determining a real-time screen-orientation identifier of the mobile terminal according to the real-time posture;
correcting the real-time screen-orientation identifier of the mobile terminal according to the correction value, to obtain a corrected real-time screen-orientation identifier; and
when the corrected real-time screen-orientation identifier is different from the screen-orientation identifier corresponding to the initial posture of the mobile terminal, performing the rotating according to a screen orientation identified by the corrected real-time screen-orientation identifier.

3. A device for controlling screen rotation, comprising:
a processor; and
a memory for storing instructions executable by the processor;
wherein the processor is configured to:
when the device enters a full-screen mode, lock a screen orientation of the device, and acquire an initial posture of the device;
monitor real-time posture of the device in real time; and
each time when the real-time posture changes in the full-screen mode, determine a screen rotation direction by comparing the real-time posture with the initial posture acquired when the mobile terminal enters the full-screen mode; and
rotate the screen orientation based on the determined screen rotation direction,
wherein:
the initial posture and the real-time posture of the mobile terminal each correspond to a gravitational acceleration of the mobile terminal, the gravitational acceleration including a component in an X-direction and a component in a Y-direction, the X-direction being a horizontal rightward direction along the mobile terminal and the Y-direction being an upright direction along the mobile terminal;
in acquiring the initial posture of the mobile terminal, the processor is further configured to:
acquire and recording the X-direction component and the Y-direction component of a gravitational acceleration of the mobile terminal when the mobile terminal enters the full-screen mode, and
determine the initial posture of the mobile terminal according to the X-direction component and the Y-direction component of the gravitational acceleration acquired when the mobile terminal enters the full-screen mode;
in monitoring the real-time posture of the mobile terminal in real time, the processor is further configured to:
monitor the X-direction component and the Y-direction component of a real-time gravitational acceleration of the mobile terminal in real time; and
determine the real-time posture of the mobile terminal according to the X-direction component and the Y-direction component of the real-time gravitational acceleration; and
in determining the screen rotation direction by comparing the real-time posture with the initial posture, the processor is further configured to:
determine a correction value for a screen-orientation identifier according to the initial posture of the mobile terminal, wherein the screen-orientation identifier is configured to identify a screen orientation of the mobile terminal as one of an upright portrait orientation, a left landscape orientation, a reverse portrait orientation, and a right landscape orientation.

4. The device according to claim 3, wherein the processor is further configured to:
determine a real-time screen-orientation identifier of the device according to the real-time posture;
correct the real-time screen-orientation identifier of the device according to the correction value, to obtain a corrected real-time screen-orientation identifier; and
when the corrected real-time screen-orientation identifier is different from the screen-orientation identifier corresponding to the initial posture of the device, performing the rotating according to a screen orientation identified by the corrected real-time screen-orientation identifier.

5. A non-transitory computer-readable storage medium storing instructions that, when executed by one or more processors of a mobile terminal, cause the mobile terminal to perform a method for controlling screen rotation, the method comprising:
when the mobile terminal enters a full-screen mode, locking a screen orientation of the mobile terminal, and acquiring an initial posture of the mobile terminal;
monitoring real-time posture of the mobile terminal in real time; and
each time when the real-time posture changes in the full-screen mode, determining a screen rotation direction by comparing the real-time posture with the initial posture acquired when the mobile terminal enters the full-screen mode; and
rotating the screen orientation based on the determined screen rotation direction,
wherein:
the initial posture and the real-time posture of the mobile terminal each correspond to a gravitational acceleration of the mobile terminal, the gravitational acceleration including a component in an X-direction and a component in a Y-direction, the X-direction being a horizontal rightward direction along the mobile terminal and the Y-direction being an upright direction along the mobile terminal;
the acquiring of the initial posture of the mobile terminal includes:
acquiring and recording the X-direction component and the Y-direction component of a gravitational acceleration of the mobile terminal when the mobile terminal enters the full-screen mode, and
determining the initial posture of the mobile terminal according to the X-direction component and the Y-direction component of the gravitational orientation acquired when the mobile terminal enters the full screen mode;
the monitoring of the real-time posture of the mobile terminal in real time includes:
monitoring the X-direction component and the Y-direction component of a real-time gravitational acceleration of the mobile terminal in real time; and
determining the real-time posture of the mobile terminal according to the X-direction component and the Y-direction component of the real-time gravitational acceleration; and
the determining of the screen rotation direction by comparing the real-time posture with the initial posture includes:
determining a correction value for a screen-orientation identifier according to the initial posture of the mobile terminal, wherein the screen-orientation identifier is configured to identify a screen orientation of the mobile terminal as one of an upright portrait orientation, a left landscape orientation, a reverse portrait orientation, and a right landscape orientation.

6. The storage medium of claim 5, wherein the determining of the screen rotation direction by comparing the real-time posture with the initial posture comprises:
determining a real-time screen-orientation identifier of the mobile terminal according to the real-time posture;

correcting the real-time screen-orientation identifier of the mobile terminal according to the correction value, to obtain a corrected real-time screen-orientation identifier; and when the corrected real-time screen-orientation identifier is different from the screen-orientation identifier corresponding to the initial posture of the mobile terminal, performing the rotating according to a screen orientation identified by the corrected real-time screen-orientation identifier.

* * * * *